(12) United States Patent
Nakamura et al.

(10) Patent No.: US 9,816,483 B2
(45) Date of Patent: Nov. 14, 2017

(54) METHOD FOR OPERATING WIND FARM AND OPERATION CONTROL SYSTEM FOR WIND FARM

(71) Applicant: MITSUBISHI HEAVY INDUSTRIES, LTD., Tokyo (JP)

(72) Inventors: Shigeaki Nakamura, Tokyo (JP); Tohru Minami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 520 days.

(21) Appl. No.: 13/736,438

(22) Filed: Jan. 8, 2013

(65) Prior Publication Data

US 2013/0214534 A1 Aug. 22, 2013

(30) Foreign Application Priority Data

Feb. 21, 2012 (JP) ................. 2012-035026

(51) Int. Cl.
*F03D 9/00* (2016.01)
*F03D 7/00* (2006.01)
(Continued)

(52) U.S. Cl.
CPC ............. *F03D 7/00* (2013.01); *F03D 7/0292* (2013.01); *F03D 7/048* (2013.01); *F03D 80/50* (2016.05);
(Continued)

(58) Field of Classification Search
CPC .......... F03D 7/029; F03D 7/00; F03D 7/0276; F03D 7/028; F03D 7/048; F03D 1/003;
(Continued)

(56) References Cited

U.S. PATENT DOCUMENTS

2002/0000723 A1 1/2002 Weitkamp
2010/0332272 A1 12/2010 Ong et al.
(Continued)

FOREIGN PATENT DOCUMENTS

| EP | 2267305 A2 | 12/2010 |
| EP | 2557311 A1 | 2/2013 |
| WO | 2011/095519 A2 | 8/2011 |

OTHER PUBLICATIONS

Extended European Search Report dated Nov. 9, 2015, corresponding to European Patent Application No. 13150999.4.

*Primary Examiner* — Igor Borissov
(74) *Attorney, Agent, or Firm* — Kanesaka Berner and Partners LLP

(57) ABSTRACT

An operation control system for a wind farm having wind turbines includes: a remaining-lifetime estimation unit for estimating remaining lifetime of a component of each wind turbine; a sales-income estimation unit for estimating, for each wind turbine, an income from sales of electric power under a plurality of output control conditions; a maintenance-cost estimation unit for estimating, for each wind turbine, maintenance cost based on the remaining lifetime of the component under each of the plurality of power limit conditions; a power-limit-condition selection unit for selecting, for each wind turbine, a power limit condition that maximizes income obtained from the wind farm, based on the income from sales of electric power and the maintenance cost estimated for each wind turbine under each of the power limit conditions; and an operation command unit for sending an operation command to each wind turbine based on the selected power limit condition.

6 Claims, 7 Drawing Sheets

(51) Int. Cl.
  *F03D 7/02* (2006.01)
  *F03D 7/04* (2006.01)
  *F03D 80/50* (2016.01)

(52) U.S. Cl.
  CPC ....... *F05B 2270/332* (2013.01); *Y02E 10/723* (2013.01)

(58) Field of Classification Search
  CPC .... F03D 11/0091; F03D 80/50; F03D 7/0292; F05B 2270/332; F05B 2260/80; Y02E 10/723; G05B 13/024; G06Q 10/20; G06Q 30/0206; Y04S 10/54
  USPC .......... 290/44, 55; 705/7.35, 7.36, 305, 1.1, 705/400, 412, 413; 415/1; 700/287; 416/1, 61
  See application file for complete search history.

(56) References Cited

U.S. PATENT DOCUMENTS

2011/0052368 A1\* 3/2011 Zhou et al. ........................ 415/1
2013/0035798 A1\* 2/2013 Zhou et al. .................. 700/287

\* cited by examiner

FIG.6

|  |  | MAINTENANCE CANDIDATE TIMING | | |
|---|---|---|---|---|
|  |  | $T_{M1}$ | $T_{M2}$ | $T_{M3}$ |
| POWER LIMIT CONDITIONS | NO LIMIT | $C_1$ | $C_2$ | $C_{full}$ |
| | 90% OF RATED POWER | $C_1$ | $C_1$ | $C_2$ |
| | 80% OF RATED POWER | 0 | $C_1$ | $C_1$ |

FIG. 7

|  |  | MAINTENANCE CANDIDATE TIMING | | |
|---|---|---|---|---|
|  |  | $T_{M1}$ | $T_{M2}$ | $T_{M3}$ |
| POWER LIMIT CONDITIONS | NO LIMIT | $C_1$ | $C_2-\Delta C$ | $C_{full}$ |
| | 90% OF RATED POWER | $C_1$ | $C_1-\Delta C$ | $C_2$ |
| | 80% OF RATED POWER | 0 | $C_1-\Delta C$ | $C_1$ |

FIG. 9
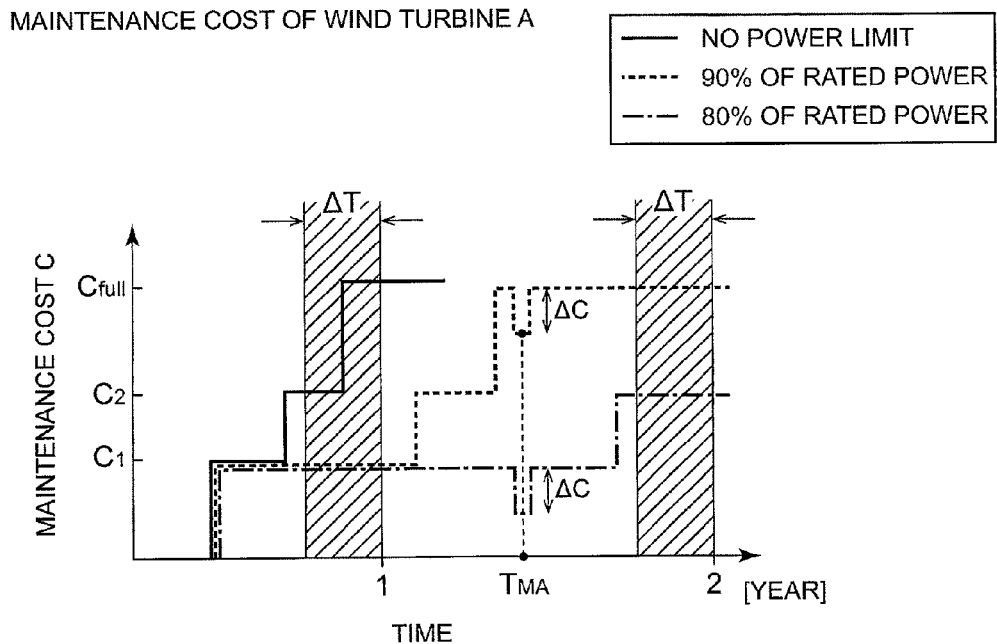
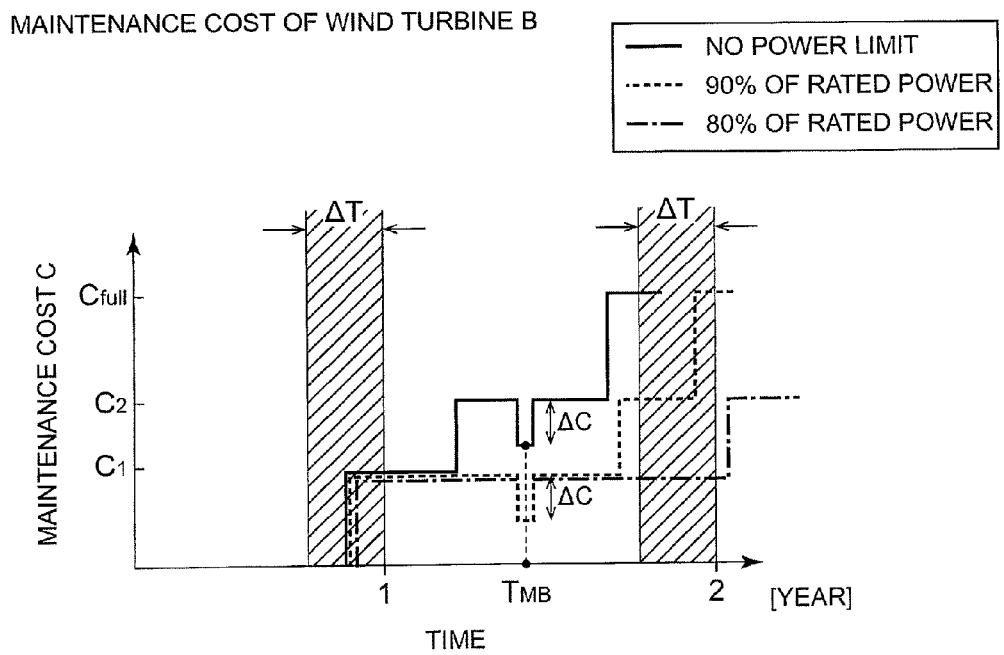

FIG. 10
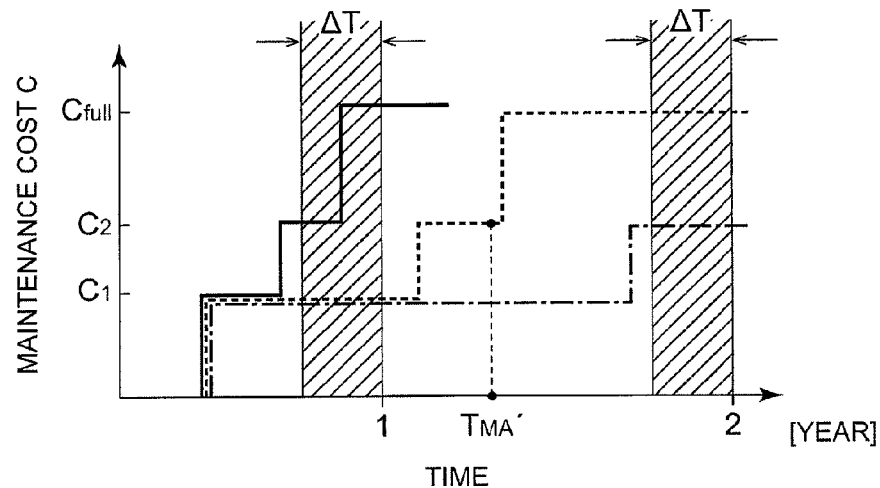
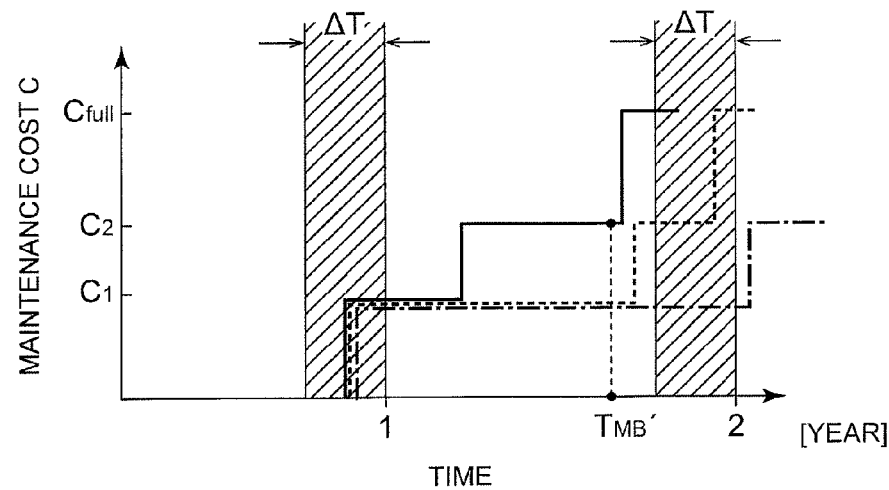

METHOD FOR OPERATING WIND FARM AND OPERATION CONTROL SYSTEM FOR WIND FARM

RELATED APPLICATIONS

The present application is based on, and claims priority from, Japanese Application Number 2012-035026, filed Feb. 21, 2012, the disclosure of which is hereby incorporated by reference herein in its entirety.

TECHNICAL FIELD

The present invention relates to a method for operating a wind farm and an operation control system for the wind farm and, in particular, to a method for operating the wind farm and an operation control system for the wind farm that achieve economical operation.

BACKGROUND ART

From a perspective of preserving the environment, wind turbine generators using wind power in a form of renewable energy are becoming popular. A wind turbine generator is normally provided with a rotor having a plurality of blades mounted to a hub. The rotor is installed to a nacelle arranged on a tower installed onshore or offshore in a standing manner. In the wind turbine generator, the rotor is rotated upon receiving wind on the blades and the rotation of the rotor is increased by a speed increaser and transmitted to a generator housed in the nacelle and finally power is generated in the generator.

The speed increaser provided between the rotor and the generator may be, for instance, a gear type having planetary gears or a hydraulic transmission type having a hydraulic pump and a hydraulic motor.

The wind turbine generator is formed by blades, a speed increaser of the gear type, the hydraulic transmission type, etc., a hub, a nacelle, bearings such as a main shaft bearing and a yaw bearing, a variety of components such as a tower. When these parts deteriorate or break down, the wind turbine generator is forced to be shut down the operation. Therefore, it is important to prevent unexpected shutdown of the wind turbine generator by monitoring conditions of the parts of the wind turbine generator.

Patent Literature 1 describes an operation method of the wind turbine generator. According to the operation method, the remaining lifetime of the component is estimated by a condition monitoring system, CMS, and the output (power production) is controlled to adjust the remaining lifetime to a desired remaining lifetime. For instance, if it is estimated that the remaining lifetime of the component won't last till the coming scheduled maintenance, the output is lowered so as to prolong the remaining lifetime of the component to reach the time of the coming scheduled maintenance. As a result, not only that unplanned shutdown due to the failed component is prevented but also that unscheduled maintenance is performed less frequently. This results in increased income obtained from such wind turbine generator.

CITATION LIST

Patent Literature

[PTL 1]
US 2010/0332272 A

SUMMARY

Technical Problem

In a wind farm having a plurality of wind turbine generators, conditions of damage and deterioration of components vary from one wind turbine generator to another. Thus, operation condition of each wind turbine generator that maximizes the income obtained from the wind turbine generator does not necessary coincided with operation condition that maximizes the income of the entire wind farm.

For instance, in a wind farm formed by a first wind turbine and a second wind turbine, a rate of deterioration of a component is often different for each wind turbine. Thus, in pursuit of maximizing the income obtained from each wind turbine, the output of each wind turbine is controlled to prolong the remaining lifetime of the component to the optimum maintenance time (the maintenance timing that maximize the income of each wind turbine) which is different for each wind turbine. However, in the wind farm, maintenance is performed on the first wind turbine and the second wind turbine at the same time in some cases to reduce the maintenance cost. Particularly, in the case of a wind farm installed where it is hard to visit, such as offshore and mountainous regions, the maintenance cost can be significantly reduced by performing maintenance on more than one wind turbine around the same time. Therefore, in some cases, it increases the income obtained from the entire wind farm to perform maintenance on the wind turbine whose component deterioration is slow (the first wind turbine) at the timing earlier than the optimum timing that maximizes the income of the wind turbine, at the same time as the wind turbine whose component deterioration is fast (the second wind turbine). In contrast, in the attempt to achieve the cost reduction by performing maintenance on the first wind turbine and the second wind turbine at the same time, if impact of changing the maintenance timing on income from sales of electric power of each wind turbine is ignored, profit of the entire wind farm is possibly compromised.

In this regard, the operation method described in Patent Literature 1 is intended for a single wind turbine generator and not intended for improving the profit of the wind farm formed by a plurality of wind turbine generators. Thus, even if the operation method of Patent Literature 1 is applied to the case of the wind farm having a plurality of wind turbines instead of a single wind turbine, it is unlikely to achieve significant increase in the profit of the entire wind farm.

In view of the above issues, it is an object of the present invention to provide an operation method of a wind farm and an operation control method for the wind farm which effectively improve profit of the entire wind farm.

Solution to Problem

According to the present invention, a method for operating a wind farm having a plurality of wind turbines, comprises the steps of:

estimating remaining lifetime of a component of each of the wind turbines;

estimating, for each of the wind turbines, an income from sales of electric power under a plurality of power limit conditions;

estimating, for each of the wind turbines, maintenance cost based on the remaining lifetime of the component under each of the plurality of power limit conditions;

selecting, for each of the wind turbines, a power limit condition that maximizes profit obtained from the wind farm, based on at least the income from sales of electric power and the maintenance cost estimated for each of the wind turbines under each of the power limit conditions; and operating each of the wind turbines based on the selected power limit condition.

According to this method, for each of the wind turbines of the wind farm, the income from sales of electric power and the maintenance cost are estimated for each of power limit conditions and then the power limit condition that maximizes the profit of the entire wind farm is selected for each of the wind turbines. Therefore, it is possible to effectively improve the profit of the entire wind farm. More specifically, instead of focusing on the profit of each of the wind turbines, here it focuses on the profit of the entire wind farm when selecting the operation condition. As a result, it is possible to operate the wind farm economically.

In the above method, the maintenance cost may be estimated for each of a plurality of candidate timings of performing coming maintenance on the component, and the power limit condition and a maintenance timing that maximize the profit obtained from the wind farm may be determined based on at least the income from sales of electric power and the maintenance cost estimated for each of the plurality of candidate timings and each of the plurality of power limit conditions.

As a result, among a plurality of combinations of the power limit condition and the maintenance timing for each wind turbine, the most favorable combination is selected, which is expected to increase the profit of the entire wind farm. As a result, it is possible to operate the wind farm even more economically.

In the above method, in the step of estimating the remaining lifetime, the remaining lifetime of the component may be estimated based on temporal change of a state value indicating a damage state or a deterioration state of the component.

As a result, it is possible to accurately estimate the remaining lifetime of the component by monitoring the state value indicating the damage state or the deterioration state of the component.

Further, as an example of the state value of the component, indicators of the damage state or the deterioration state of components are described below. The damage state or the deterioration state of the blade may be indicated by weight of the blade, weight imbalance between of the blades, vibration of the blade, etc. The damage state or the deterioration state of the tower may be indicated by fatigue load of a bottom part or a top part of the tower, vibration of the tower, etc. The damage state or the deterioration state of the speed increaser may be indicated by vibration of the main shaft bearing or the hydraulic pump, vibration and whirling of the main shaft, piston vibration and amplitude of the hydraulic pump, performance of the hydraulic transmission, etc. The damage state or the deterioration state of parts made of cast metal such as the nacelle baseplate and the hub (a rotor head) may be indicated by fatigue caused by stress concentration, etc.

The above method may further comprise the step of stopping operation of the wind turbine having the component in such a case that the state value of said component is not within a regulation range.

As a result, when the state value of the component becomes outside the regulation range, the wind turbine having this component is shut down before the component becomes completely damaged. As a result, it is possible to avoid the situation in which the wind turbine is forced to be shut down for a long period of time.

According to the present invention, an operation control system for a wind farm having a plurality of wind turbines, may comprise:

a remaining-lifetime estimation unit for estimating remaining lifetime of a component of each of the wind turbines;

a sales-income estimation unit for estimating, for each of the wind turbines, an income from sales of electric power under a plurality of output control conditions;

a maintenance-cost estimation unit for estimating, for each of the wind turbines, maintenance cost based on the remaining lifetime of the component under each of the plurality of power limit conditions;

a power-limit-condition selection unit for selecting, for each of the wind turbines, a power limit condition that maximizes income obtained from the wind farm, based on at least the income from sales of electric power and the maintenance cost estimated for each of the wind turbines under each of the power limit conditions; and an operation command unit for sending an operation command to each of the wind turbines based on the selected power limit condition.

According to this operation control system, for each of the wind turbines of the wind farm, the income from sales of electric power and the maintenance cost are estimated for each of power limit conditions and then the power limit condition that maximizes the profit of the entire wind farm is selected for each of the wind turbines. Therefore, it is possible to effectively improve the profit of the entire wind farm. More specifically, instead of focusing on the profit of each wind turbine, here it focuses on the profit of the entire wind farm when selecting the operation condition. As a result, it is possible to operate the wind farm economically.

Advantageous Effects of Invention

According to this invention, for each of the wind turbines of the wind farm, the income from sales of electric power and the maintenance cost are estimated for each of power limit conditions and then the power limit condition that maximizes the profit of the entire wind farm is selected for each of the wind turbines. Therefore, it is possible to effectively improve the profit of the entire wind farm. More specifically, instead of focusing on the profit of each of the wind turbines, here it focuses on the profit of the entire wind farm when selecting the operation condition. As a result, it is possible to operate the wind farm economically.

BRIEF DESCRIPTION OF DRAWINGS

FIG. 6 is a table showing one example of maintenance cost C estimated for each power limit condition and each candidate maintenance timing.

FIG. 7 is a table showing another example of maintenance cost estimated for each power limit condition and each candidate maintenance timing, by taking into consideration cost reduction effect ΔC of performing maintenance at the same time as another wind turbine.

FIG. 9 shows how the power limit condition and the maintenance timing of wind turbines A, B are determined according to an embodiment of the present invention.

FIG. 10 shows how the power limit condition and the maintenance timing of the wind turbines A, B are determined in pursuit of maximum profit of each wind turbine independently.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

Figure 1:
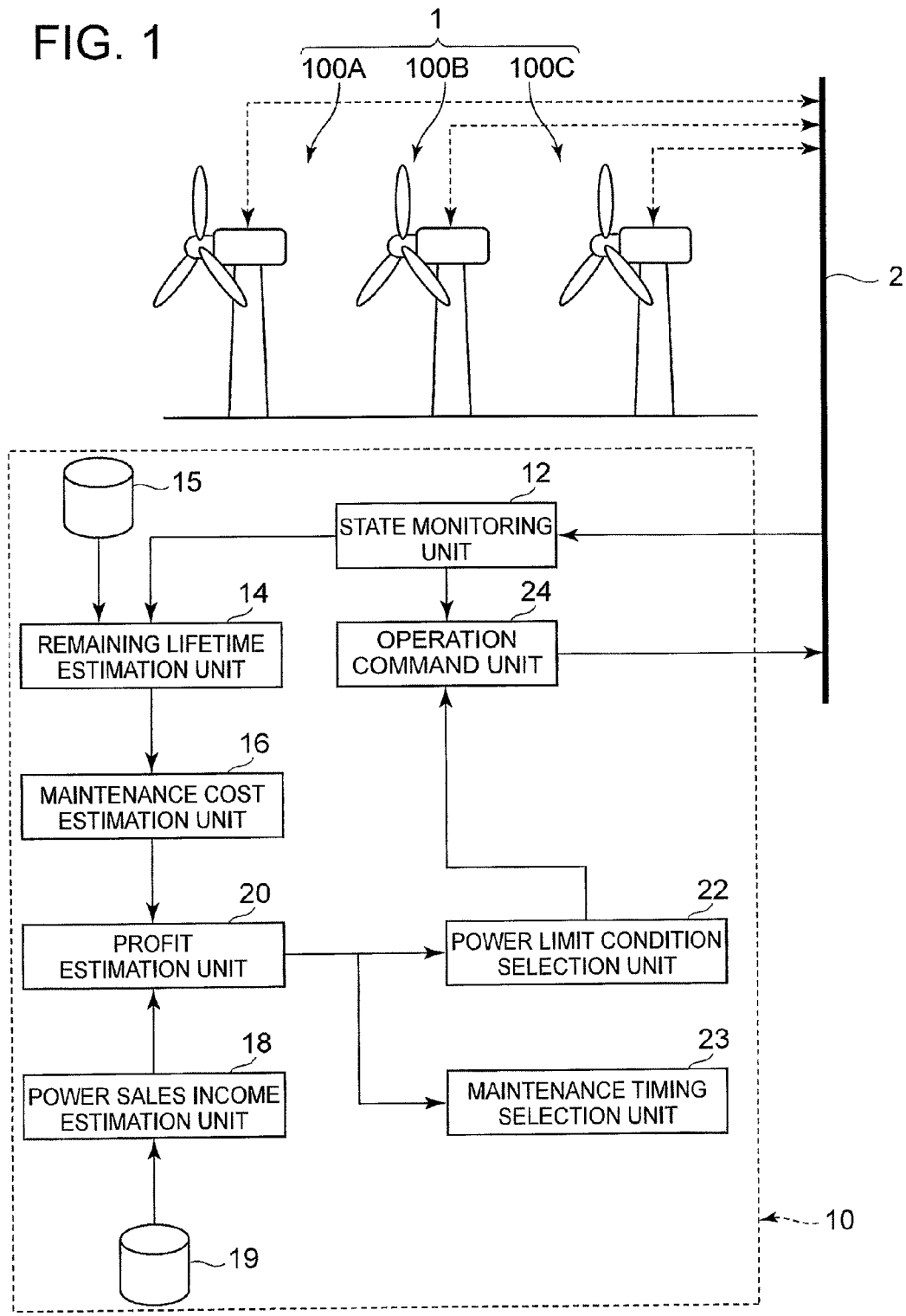
FIG. 1 is an illustration of a configuration example of an operation control system for a wind farm.
Figure 2:
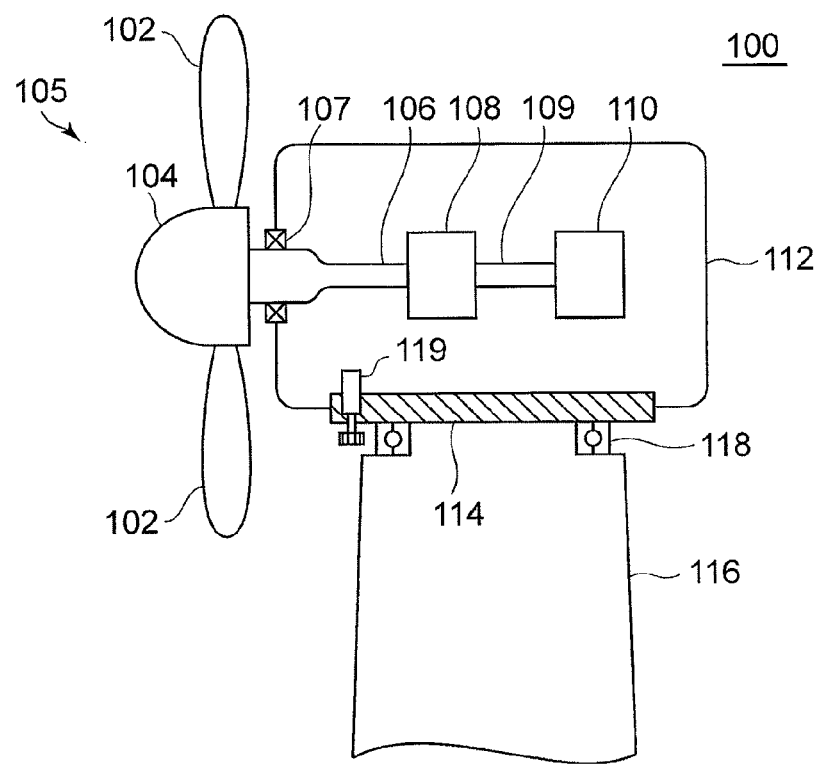
FIG. 2 is an illustration of one version of a wind turbine which is a part of the wind farm.
Figure 3:
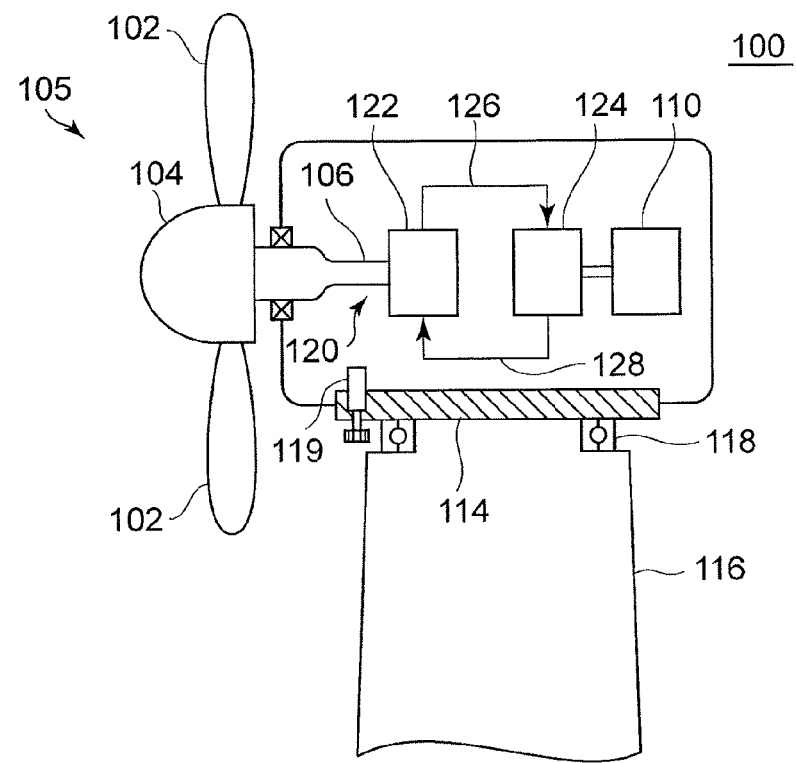
FIG. 3 is an illustration of another version of the wind turbine which is a part of the wind farm.

FIG. 1 is an illustration of a configuration example of an operation control system for a wind farm. FIG. 2 is an illustration of one version of the wind turbine which is a part of the wind farm. FIG. 3 is an illustration of another version of the wind turbine which is a part of the wind farm.

An operation control system 10 of FIG. 1 controls operation of a wind farm 1 having a plurality of wind turbines 100A-100C. First, the wind turbines 100A-100C of the wind farm 1 are described and then, the operation control system 10 is described in details.

Each of the wind turbines 100A-100C of the wind farm 1, as illustrated in FIG. 2, may be provided with: a rotor 105 formed by a plurality of blades 102 and a hub 104 where the blades 102 are mounted; a main shaft 106 coupled to the hub 104; a speed increaser 108 of gear type for increasing rotation speed of the main shaft 106; and a generator 110 connected to an output shaft 109 of the speed increaser 108. Further, the speed increaser 108 and the generator 110 may be housed in a nacelle 112 which supports the main shaft 106 rotatably via a main shaft bearing 107. A nacelle baseplate 114 constituting a bottom surface of the nacelle 112 may be supported by a tower 116 via a yaw bearing 118. Further, to the nacelle baseplate 114, a yaw turning mechanism 119 is fixed. The yaw turning mechanism 119 includes a yaw motor and a pinion gear. The yaw turning mechanism 119 may be configured so that the nacelle 112 is turnable relative to the tower 116 by driving the yaw motor in such a state that the pinion gear of the yaw turning mechanism 119 meshes with a ring gear provided on the tower 116 side. Furthermore, each of the blades 102 may be configured the blade 102 is supported by the hub 104 via a blade turning bearing (not shown) and a pitch angle is adjustable by a pitch drive actuator provided in the hub 104.

Each of the wind turbines 100A-100C of the wind farm 1 may be configured so that rotational energy of the main shaft 106 is transmittable to the generator 110 via a drive train having a hydraulic transmission 120 as illustrated in FIG. 3, instead of the speed increaser 108 of gear type.

As illustrated in FIG. 3, the hydraulic transmission 120 is provided with a hydraulic pump 122 rotating with the main shaft 106 to pressurize oil and a hydraulic motor 124 driven by the pressurized oil from the hydraulic pump 122 to input the rotation to the generator 110. Further, an outlet of the hydraulic pump 122 is connected to an inlet of the hydraulic motor by a high pressure oil line 126. An inlet of the hydraulic pump 122 is connected to an outlet of the hydraulic motor 124 by a low pressure oil line 128. As a result, the hydraulic pump 124 driven by rotation of the main shaft 106 pressurizes operating oil supplied from the low pressure oil line 128 and discharges it to the high pressure oil line 126, and the hydraulic motor 124 is driven by the pressurized operating oil (pressurized oil), and then the rotational energy is inputted from the hydraulic motor 124 to the generator 110. As a result, the rotational energy of the main shaft 106 is transmitted to the generator 110 via the hydraulic transmission 120.

In the wind turbine having the above configuration illustrated in FIG. 2 or FIG. 3, a state value X indicating a damage state or deterioration state of each component is obtained by a state-value detection sensor. The detected state value X is then reported to a state monitoring unit 12 of the operation control system 10.

As a particular example of the state value X of each component of each of the wind turbines 100A-100C, indicators of the damage state or the deterioration state of components are described below. The damage state or the deterioration state of the blade 102 may be indicated by weight of the blade 2, weight imbalance between the blades 102, vibration of the blade 102, etc. The damage state or the deterioration state of the tower 116 may be indicated by fatigue load of a bottom part or a top part of the tower 116, vibration of the tower 116, etc. The damage state or the deterioration state of the speed increaser 108 or the hydraulic transmission 120 may be indicated by vibration of the main shaft bearing 107 or the hydraulic pump 122, vibration and whirling of the main shaft 106, piston vibration and amplitude of the hydraulic pump 122, performance of the hydraulic transmission 120, etc. The damage state or the deterioration state of parts made of cast metal such as the nacelle baseplate 114 and the hub 104 may be indicated by fatigue caused by stress concentration, etc.

For instance, as the state-value detection sensor, an optical fiber sensor (FBG: Fiber Bragg Grating) embedded in each blade 102 may be used. The optical fiber sensor measures strain and coverts it into a bending moment. Then, from the sine function component contained in the bending moment, the weight of the blade 102 which is one example of the state value X may be calculated. Further, weight change of the blade 102 is caused by the damage of the blade 102 from lightning or collision with a flying object, ice buildup on the blade, etc. Furthermore, from the weight calculated in a similar manner, weight imbalance between the blades 12 (moment of the rotor 105) which is another example of the state value X may be calculated. An acceleration sensor attached to the blade 102 may be used as the state-value detection sensor and the vibration of the blade 102 which is another example of the state value X may be calculated from the measurement result of the acceleration sensor.

Alternatively, a strain gauge attached to the upper part of the tower 116 may be used as the state value detection sensor and from the bending and strain measured by the strain gauge, the fatigue load of the upper part of the tower 116 which is one example of the state-value X may be calculated. Further, a strain gauge attached to a lower part of the tower 116 may be used as the state-value detection sensor and from the bending or load measured by the strain gauge, the fatigue load of the base part of the tower 116 which is another example of the state value X may be calculated. Furthermore, the acceleration sensor attached to the tower 116 may be used as the state-value detection sensor and from the measurement result of the acceleration sensor, the vibration of the tower 116 which is one example of the state value may be calculated.

Alternatively, in the case where the state value X is vibration of bearings such as the main shaft bearing 107, the blade turning bearing, the yaw bearing 118, and bearings provided in the hydraulic pump 122 and the hydraulic motor 124 (a pump bearing and a motor bearing), acceleration sensors directly or indirectly attached to these bearings may be used as the state-value detection sensor. Further, in the case where the vibration or whirling of the main shaft 106 is the state value X, the acceleration sensor attached to the main shaft 106 may be used as the state-value detection sensor. In the case where the hydraulic pump 122 or the hydraulic motor 124 is provided with a plurality of pistons, cylinders for guiding the pistons, and a cam for reciprocating each of the pistons or a cam rotated by reciprocating motion of each of the pistons, the acceleration sensor attached to a casing of the hydraulic pump 122 or the hydraulic motor 124 is used as the state-value detection sensor so as to obtain vibration/amplitude of the piston as the state value X. Further, in the case where the efficiency of the hydraulic transmission 120 is the state value X, a pressure sensor provided in the high pressure oil line 126 and a rotation speed sensor attached to the main shaft 106 may be used and from the measurement values of these sensors, output of the hydraulic pump 122 may be calculated and electric output of the generator measured by a voltage/current sensor may be divided by the output of the hydraulic pump 122. In this manner, the efficiency of the hydraulic transmission is calculated. In this case, combination of the pressure sensor, the rotation speed sensor and the voltage/current sensor functions as the state-value detection sensor.

Moreover, the state value X may be obtained by the state-value detection sensor continuously or periodically, or may be obtained when a prescribed condition is met. For instance, when a lightning stroke sensor (an electric-current sensor installed in a blade root part or the like) detects lightning strikes on the blade 102, the state value X of the blade 102 may be obtained by the state-value detection sensor.

The wind turbines 100A-100C having the above structure are connected to the operation control system 10 via a signal line (a bus) 2 as illustrated in FIG. 1. The signal line 2 is configured so that information is exchanged between each of the wind turbines 100A-100C and the operation control system 10. The signal line is used, for instance, for sending information regarding the state of the component of each of the wind turbines 100A-100C to the operation control system 10 or for sending control signal from the operation control system 10 to each of the wind turbines 100A-100C.

In the case illustrated in FIG. 1, the operation control system 10 is mainly provided with a state monitoring unit 12, a remaining-lifetime estimation unit 14, a maintenance cost estimation unit 16, a sales income estimation unit 18, a profit estimation unit 20, a power limit condition selection unit 22, a maintenance timing selection unit 23 and an operation command unit 24.

The state monitoring unit 12 receives the state value X from each of the wind turbines 100A-100C via the signal line 2 and monitors the state of the component of each of the wind turbines 100A-100C. The state value X indicates the damage state or the deterioration state of the component of each of the wind turbines 100A-100C. The state value is obtained by the above state-value detection sensor provided in each of the wind turbines 100A-100C. The state monitoring unit 12 is configured to determine whether or not the state value of the component of each of the wind turbines 100A-100C is within a regulation range. If the state monitoring unit 12 determines that the state value of the component of a certain one of the wind turbines 100A-100C is not within the regulation range, the operation of the certain one of the wind turbines 100A-100C is stopped according to the command sent from the operation command unit 24 which is described later in details. For instance, if there is a wind turbine whose state value of the component reaches a prescribed threshold value set on a safer side of a threshold value $X_{th}$ corresponding to total damage of the component (see FIG. 4), that wind turbine may be shut down. Meanwhile, the remaining ones of the wind turbines 100A-100C, whose state value of the component is within the regulation range, may continue to operate and the remaining lifetime of the component of those wind turbines may be estimated by the remaining-lifetime estimation unit 14.

The remaining-lifetime estimation unit 14 is configured to estimate the remaining lifetime of the component for each of the wind turbines 100A-100C. The remaining-lifetime estimation unit 14 may estimate the remaining lifetime based on, for instance, a temporal change of the state value indicating the damage state or the deterioration state of the component of each of the wind turbines 100A-100C. As the temporal change of the state value of the component, data stored in a state-value database 15 may be used.

Figure 4:
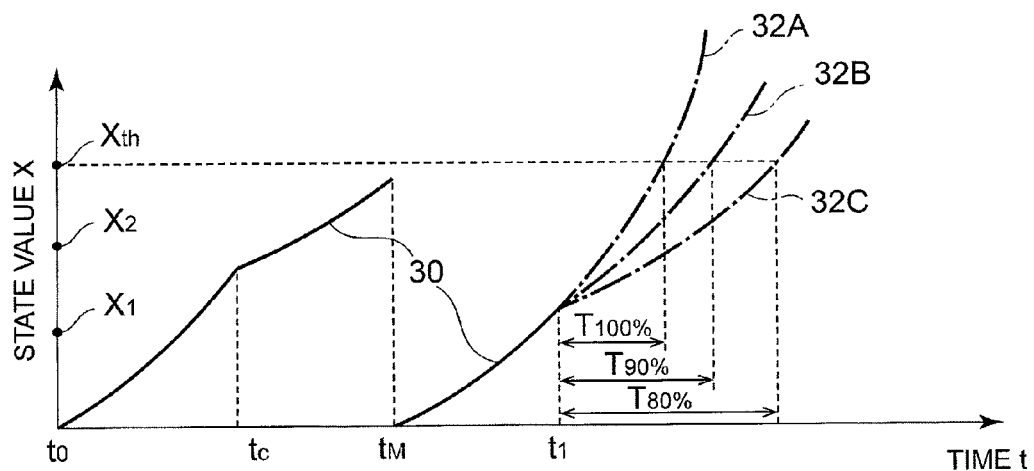
FIG. 4 is a graph showing a temporal change of a state value indicating a damage state or a deterioration state of a component.

FIG. 4 is a graph showing the temporal change of the state value indicating the damage state or the deterioration state of the component. In the graph, the maximum power of the wind turbine is not limited between time $t_0$ to time $t_c$ (but limited to or below a rated power). At time $t_c$, the maximum power of the wind turbine is limited to 80% of the rated power. At time $t_M$ and beyond, the temporal change of the state value when maintenance is performed on the component is illustrated in the graph.

According to the temporal change 30 of the state value X from time $t_0$ to time $t_1$; the state value X rises rapidly from time $t_0$ to time $t_c$; the maximum power of the wind turbine is limited to 80% of the rated power at time $t_c$, and thus the rate of rise of the state value X decreases; maintenance is performed on the component at time $t_M$ and thus the state value X drops to an initial value; and then the state value X rises again over time. This temporal change 30 is stored in the state value database 15 and is used for estimating the remaining lifetime of the component fare.

The remaining-lifetime estimation unit 14 may be configured to estimate each change curve 32A-32C of the state value for each power limit condition in the future after the present time $t_1$ and calculate time for the state value X to reach the threshold value $X_{th}$ (remaining lifetime $T_{100\%}$, $T_{90\%}$, $T_{80\%}$ . . . ) from the change curves 32A-32C. The threshold value $X_{th}$ corresponds to the total damage of the component. Herein, the remaining lifetime $T_{100\%}$ means the remaining lifetime of the component in the case where there is no limit on the maximum power of the wind turbine (the time for the state value X to reach threshold value $X_{th}$). Similarly, the remaining lifetime $T_{90\%}$ means the remaining lifetime of the component in the case where the maximum power of the wind turbine is limited to 90% of the rated power and the remaining lifetime $T_{80\%}$ means the remaining lifetime of the component in the case where the maximum power of the wind turbine is limited to 80% of the rated power.

The remaining-lifetime estimation unit 14 may obtain, in addition to the time for the state value X to reach the threshold value $X_{th}$ (the remaining lifetime $T_{100\%}$, $T_{90\%}$, $T_{80\%}$ . . . ), time to reach safer threshold values $X_1$, $X_2$ that are on a safe side of the threshold value $X_{th}$. Further, the threshold values $X_1$, $X_2$ are critical state values beyond which the maintenance cost drastically changes.

The estimation result of the remaining-lifetime estimation unit 14 is used in the maintenance cost estimation unit 16 to estimate the maintenance cost of each of the wind turbines 100A-100C.

The maintenance cost estimation unit 16 is configured to estimate, for each of the wind turbines 100A-100C, the maintenance cost under each power limit condition based on the remaining lifetime of the component $T_{100\%}$, $T_{90\%}$, $T_{80\%}$ . . . . The maintenance cost may be the sum of the maintenance cost estimated for each component of each of the wind turbines 100A-100C.

Figure 5:
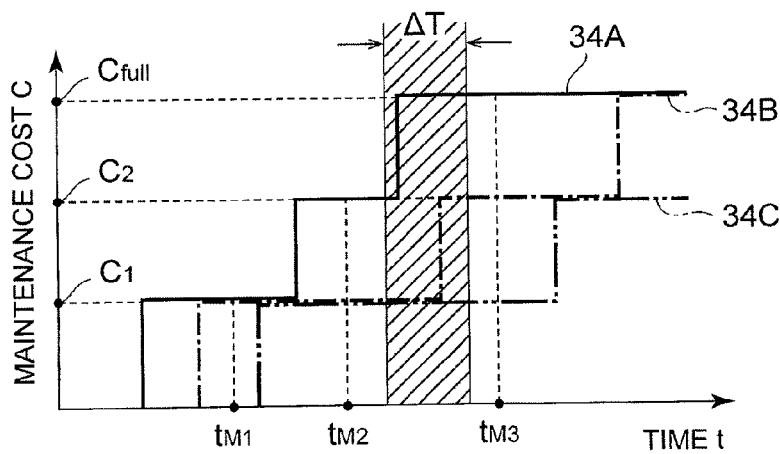
FIG. 5 is a graph showing a temporal change of maintenance cost of the component under each power limit condition.

FIG. 5 is a graph showing the temporal change of maintenance cost of the component under each power limit condition.

In the case illustrated in FIG. 5, there are three types of the maintenance cost C, $C_1$, $C_2$, $C_{full}$ in accordance with damage/deterioration levels of the component corresponding to the threshold values $X_1$, $X_2$, $X_{th}$ of the state value of the component. More specifically, when the state value X of the component is below $X_1$, maintenance is unnecessary and there is no maintenance cost but once the state value X of the component exceeds $X_1$, a first-level maintenance which is the most simple one may be considered. To perform the first-level maintenance, it requires the maintenance cost $C_1$. When the damage or deterioration of the component progresses and the state value X exceeds the threshold value $X_2$, a second-level maintenance which is relatively simple may be considered. To perform the second-level maintenance, it requires the maintenance cost $C_2$ ($>C_1$). When the damage or deterioration of the component progresses and the state value X exceeds the threshold value $X_{th}$ corresponding to the total damage of the component, a final-level maintenance is needed. In the final-level maintenance requires replacement and overhaul of the component. The wind turbine having said component is forced to be shut down. To perform the final-level maintenance, it requires the maintenance cost $C_{full}$ ($>C_2$).

The estimation result of the remaining-lifetime estimation unit 14 relies on each power limit condition. Thus, the maintenance cost C estimated by the maintenance cost estimation unit 16 varies for each power limit condition, illustrating the temporal changes 34A, 34B, 34C. The temporal change 34A corresponds to the case where the maximum power of the wind turbine is not limited, the temporal change 34B corresponds to the case where the maximum power of the wind turbine is limited to 90% of the rated power, and the temporal change 34C corresponds to the case where the maximum power of the wind turbine is limited to 80% of the rated power.

The maintenance cost estimation unit 16 may estimate, for each of the wind turbines 100A-100C, the maintenance cost C under each of the power limit conditions for each of candidate timings $T_{M1}$, $T_{M2}$, $T_{M3}$ of performing coming maintenance on the component.

The candidate timings $T_{M1}$, $T_{M2}$, $T_{M3}$ may be set to avoid time ΔT during which it is hard to perform maintenance. For instance, the candidate timings $T_{M1}$, $T_{M2}$, $T_{M3}$ may be set avoiding time ΔT during which there is a high possibility of restricted access to the wind turbines 100A-100C due to typhoons, storm, etc. Further, the difficult time ΔT for performing maintenance rely on geographical conditions of the wind farm 1 and thus the time ΔT can be known from past weather information and conducted-maintenance information corresponding to the weather information. By setting the candidate timings $T_{M1}$, $T_{M2}$, $T_{M3}$ while avoiding the difficult time ΔT for performing maintenance, maintenance can be withheld until the conditions are favorable to perform maintenance, thereby avoiding economical loss.

FIG. 6 is a table showing one example of the maintenance cost C estimated for each power limit condition and each candidate maintenance timing.

As illustrated in FIG. 6, in the case where the maximum power of the wind turbine is not limited (the temporal change 34A of FIG. 5), the maintenance cost C is $C_1$, $C_2$, $C_{full}$ in correspondence to the candidate timings $T_{M1}$, $T_{M2}$, $T_{M3}$. In the case where the maximum power of the wind turbine is limited to 90% of the rated power (the temporal change 34B of FIG. 5), the maintenance cost C is $C_1$, $C_1$, $C_2$ in correspondence to the candidate timings $T_{M1}$, $T_{M2}$, $T_{M3}$. In the case where the maximum power of the wind turbine is limited to 80% of the rated power (the temporal change 34C of FIG. 5), the maintenance cost C is 0, $C_1$, $C_1$ in correspondence to the candidate timings $T_{M1}$, $T_{M2}$, $T_{M3}$.

When estimating the maintenance cost C of the component of each of the wind turbines 100A-100C, the maintenance cost estimation unit 16 may take into consideration cost reduction effect ΔC of performing maintenance at the same time as another wind turbine.

For instance, in the case illustrated in FIG. 6, in the case where maintenance is performed on another wind turbine as well at the candidate timing $T_{M2}$, the cost reduction effect ΔC may be taken into consideration and the maintenance cost C may be estimated as illustrated in FIG. 7. In the case illustrated in FIG. 7, the maintenance cost under each power limit condition at the candidate timing $T_{M2}$ is reduced by ΔC compared to the case illustrated in FIG. 6.

To maximize the cost reduction effect ΔC of performing maintenance at the same time as another wind turbine, in the case of the wind turbine 100A being the one whose damage or deterioration of the component progresses fastest, an estimated timing of performing maintenance on the wind turbine 100A right before or after the lifetime of the wind turbine ends may be included in the candidate timing $T_{M1}$, $T_{M2}$, $T_{M3}$ of the other wind turbines 100B, 100C. Or, in the case where the state value X of the component of the wind turbine 100A has exceeded the threshold value Xth and the wind turbine 100A is already shut down, the current timing may be included in the candidate timing $T_{M1}$, $T_{M2}$, $T_{M3}$ of the other wind turbines 100B, 100C.

As a result, the cost reduction effect ΔC of performing maintenance at the same time as the wind turbine 100A on which maintenance is performed at the earliest timing, is reflected on estimation of the maintenance costs C of the other wind turbines 100B, 100C.

Normally, scheduled maintenance of the wind farm 1 is regularly performed on all the wind turbines 100A-100C regardless of the damage or deterioration state of the component. Thus, by performing maintenance and/or repair of the component at the same timing as the scheduled maintenance, the cost reduction effect ΔC can be expected. Therefore, the candidate timing $T_{M1}$, $T_{M2}$, $T_{M3}$ may be set to include the timing of the scheduled maintenance of the wind farm 1.

Referring to FIG. 1, the sales income estimation unit 18 is configured to estimate, for each of the wind turbines 100A-100C, income from sales of electric power under a plurality of power limit conditions. The sales income estimation unit 18 retrieves, from a wind condition database 19, Weibull distribution which shows wind speed occurrence rate in correspondence to each of the wind turbines 100A-100C and estimates power production under each of the power limit conditions. In this manner, it is possible to estimate the income from sales of electric power from each of the wind turbines 100A-100C.

Further, the sales income estimation unit 18 may calculate the income from sales of electric to be zero during the shutdown of the wind turbine 100A-100C due to the total damage of the component. In this case, the income from sales of electric power obtained from each of the wind turbines 100A-100C varies depending on the maintenance timing of each of the wind turbines 100A-100C. Thus, the sales income estimation unit 18 may estimate income from sales of electric power for each candidate maintenance timing $T_{M1}$, $T_{M2}$, $T_{M3}$.

The profit estimation unit 20 is configured to estimate the profit of the entire wind farm 1 based on the maintenance cost C of each of the wind turbines 100A-100C estimated by the maintenance cost estimation unit 16 and the income from sales of the electric power of each of the wind turbines 100A-100C estimated by the sales income estimation unit 18.

The profit estimation unit 20 may estimate, as the most simple estimation method, the profit of the entire wind farm by deducting the total maintenance cost of each of the wind turbines 100A-100C estimated by the maintenance cost estimation unit 16 from the total income from sales of electric power of each of the wind turbines 100A-100C estimated by the sales income estimation unit 18.

The power limit condition selection unit 22 may be configured to select, for each of the wind turbines 100A-100C, the power limit condition that maximizes the profit of the entire wind farm 1 estimated by the profit estimation unit 20. Then, based on the selected power limit condition, an operation command is sent to each of the wind turbines 100A-100C from the operation command unit 24. Each of the wind turbines 100A-100C operates to satisfy the power limit condition in accordance with the operation command from the operation command unit 24. For instance, in the case where the operation command for limiting the maximum power to 90% of the rated power is sent to the wind turbine 100A, a wind turbine controller (not shown) of the wind turbine 100A controls so that the electric power produced by the generator 110 does not exceed 90% of the rated power.

The maintenance timing selection unit 23 may be configured to select, for each of the wind turbines 100A-100C, the candidate maintenance timing that maximizes the profit of the entire wind farm 1 estimated by the profit estimation unit 20. The selected candidate maintenance timing may be informed, in any method, to administrators of the wind farm 1, workers in charge of maintenance, etc. For instance, the selected candidate maintenance timing may be shown on a display of a control room of the wind farm 1 or may be shown on a portable terminal device owned by the workers.

Figure 8:
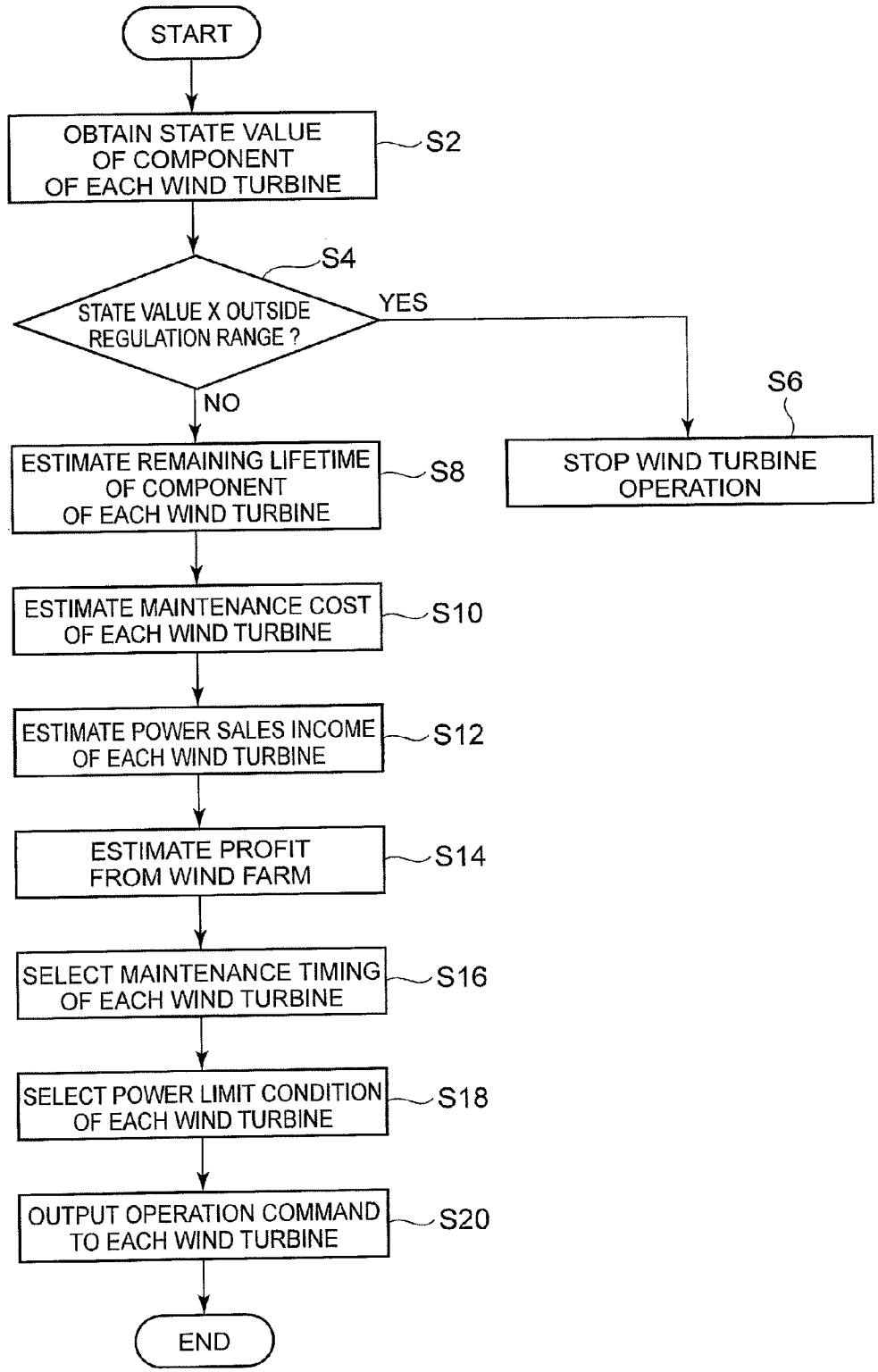
FIG. 8 is a flowchart on how to operate the wind farm.

The operation method of the wind farm 1 is described. FIG. 8 is a flowchart on how to operate the wind farm 1.

As illustrated in FIG. 8, first the state value X of the component of each of the wind turbines 100A-100C is obtained from the wind farm 1 via the signal line 2 by means of the state monitoring unit 12 of the operation control system 10 (step S2). Then, in the state monitoring unit 12, it is determined whether or not the state value X of the component of each of the wind turbines 100A-100C is within the regulation range (step S4). If it is determined that the state value X of the component of each of the wind turbines 100A-100C is not within the regulation range (YES in step S4), the process advances to step S6 to send the operation shutdown command from the operation command unit 24 to the wind turbine having the component.

In contrast, as for a wind turbine whose state value X of the component is determined to be within the regulation range, the remaining lifetime of the component is estimated by the remaining-lifetime estimation unit 14 for each power limit condition. In this step, the remaining-lifetime estimation unit 14 may estimate the remaining lifetime of the component based on the temporal change 30 of the state value stored in the state value database 15. For instance, in the remaining-lifetime estimation unit 14, the change curves 32A-32C of the state value X in the future after the present time $t_1$ may be estimated for each power limit condition and from the change curves 32A-32C, the time to reach the threshold value $X_{th}$ (remaining lifetime $T_{100\%}$, $T_{90\%}$, $T_{80\%}$ . . . ) may be obtained. The threshold value $X_{th}$ corresponds to the total damage of the component. Further, the remaining-lifetime estimation unit 14 may obtain, in addition to the time for the state value X to reach the threshold value $X_{th}$ (the remaining lifetime $T_{100\%}$, $T_{90\%}$, $T_{80\%}$ . . . ), time to reach safer threshold values $X_1$, $X_2$ that are on a safe side of the threshold value $X_{th}$ which has critical effect on the maintenance cost.

Next, the process advances to step S10. In step S10, the maintenance cost of the component of each of the wind turbines 100A-100C is estimated in the maintenance cost estimation unit 16 based on the remaining lifetime $T_{100\%}$, $T_{90\%}$, $T_{80\%}$ . . . . In this step, the maintenance cost estimation unit 16 may estimate, for each of the wind turbines 100A-100C, the maintenance cost C under each power limit condition for each candidate timing $T_{M1}$, $T_{M2}$, $T_{M3}$ of performing the coming maintenance. Further, when estimating the maintenance cost C of the component of each of the wind turbines 100A-100, the cost reduction effect $\Delta C$ of performing maintenance together with the scheduled maintenance of the wind farm 1 or at the same time as another wind turbine, may be taken into consideration.

In step S12, the income from sales of electric power is estimated, for each of the wind turbines 100A-100C, by the sales income estimation unit 18 under the power limit conditions. When estimating the income from sales of electric power, the income from sales of electric may be calculated zero during the shutdown of the wind turbine 100A-100C due to the total damage of the component. In this case, the income from sales of electric power obtained from each of the wind turbines 100A-100C varies depending on the maintenance timing of each of the wind turbines 100A-100C. Thus, the income from sales of electric power may be estimated for each candidate maintenance timing $T_{M1}$, $T_{M2}$, $T_{M3}$.

Next, the profit of the entire wind farm 1 is estimated in the profit estimation unit 20 based on the maintenance cost of each of the wind turbines 100A-100C estimated in step S10 and the income from sales of the electric power of each of the wind turbines 100A-100C estimated in step S12 (step S14). For instance, the profit estimation unit 20 may estimate, as the most simple estimation method, the profit of the entire wind farm 1 by deducting the total maintenance cost C of each of the wind turbines 100A-100C estimated in step S10 from the total income from sales of electric power of each of the wind turbines 100A-100C estimated in step S12.

Then, the candidate maintenance timing that maximizes the profit of the entire wind farm 1 is selected, for each of the wind turbines 100A-100C, in the maintenance timing selection unit 23 (step S16).

Further, in the power limit condition selection unit 22, the power limit condition that maximizes the profit of the entire wind farm 1 is selected for each of the wind turbines 100A-100C (step S18). Then, based on the selected power limit condition, each of the wind turbines 100A-100C is operated through the operation command unit 24 (step S20). As a result, each of the wind turbines 100A-100C is operated under the power limit condition which maximizes the profit of the entire find farm 1.

As described above, according to this embodiment, for each of the wind turbines 100A-100C, the income from sales of electric power and the maintenance cost are estimated for each of power limit conditions and then the power limit condition that maximizes the profit of the entire wind farm 1 is selected for each of the wind turbines 100A-100C. Therefore, it is possible to effectively improve the profit of the entire wind farm 1. More specifically, instead of focusing on the profit of each of the wind turbines 100A-100C, here it focuses on the profit of the entire wind farm 1 when selecting the operation condition. As a result, it is possible to operate the wind farm 1 economically.

Moreover, the income from sales of electric power and the maintenance cost of each of the wind turbines 100A-100C are estimated for each power limit condition and for each candidate maintenance timing $T_{M1}$, $T_{M2}$, $T_{M3}$ and combination of the power limit condition and the maintenance timing that maximizes the profit of the entire wind farm 1 is selected for each of the wind turbines 100A-100C. As a result, it is possible to operate the wind farm even more economically.

Further, in the case where the state value X of the component is outside the regulation range, the wind turbine having this component is shut down so as to stop the operation of the wind turbine before this component becomes completely damaged. As a result, it is possible to avoid the situation in which the wind turbine is forced to be shut down for a long period of time.

Application of this Embodiment

Economical effects of applying this embodiment to the wind farm 1 formed of the wind turbine A and the wind turbine B is described in details.

FIG. 9 shows how the power limit condition and the maintenance timing of the wind turbines A, B are determined according to the above embodiment. FIG. 10 shows how the power limit condition and the maintenance timing of the wind turbines A, B are determined to maximize the profit of each wind turbine independently. FIG. 9 and FIG. 10 illustrate temporal change in the case where the maximum power of the wind turbine A or B is not limited, the case where the maximum power of the wind turbine A or B is limited to 90% of the rated power, and the case where the maximum power of the wind turbine A or B is limited to 80% of the rated power.

As illustrated in FIG. 10, in the case of determining the power limit condition and the maintenance cost to maximize the profit of each wind turbine A, B, combination of the 90% power limit condition and the maintenance timing $T_{MA'}$ is selected for the wind turbine A and combination of the no-limit power limit condition and the maintenance timing $T_{MB'}$ is selected for the wind turbine B. The maintenance timing $T_{MA'}$ is the timing just before the maintenance cost C of the wind turbine A reaches $C_{full}$ under the 90% power limit condition. The maintenance timing $T_{MB'}$ is the timing just before the maintenance cost C of the wind turbine B reaches $C_{full}$ under the no-limit power limit condition.

In the case illustrated in FIG. 10, the above combination is selected so as to maximize the profit of each wind turbine by considering lost earnings resulting from the wind turbine shutdown due to total damage of the component during wintertime when the wind speed is high and it is stormy (the difficult time ΔT to perform maintenance) and lost earnings resulting from limiting the maximum power of the wind turbine.

In contrast, as illustrated in FIG. 9, in the case of determining the power limit condition and the maintenance cost to maximize the profit of the entire wind farm 1 (the wind turbine A and the wind turbine B), combination of the 90% power limit condition and the maintenance timing $T_{MA}$ is selected for the wind turbine A and combination of the no-limit power limit condition and the maintenance timing $T_{MB}$ is selected for the wind turbine B. The maintenance timing $T_{MA}$ is the timing just after the maintenance cost C of the wind turbine A reaches $C_{full}$ under the 90% power limit condition. The maintenance timing $T_{MB}$ is the timing when the maintenance cost C of the wind turbine B is at $C_2$ under the no-limit power limit condition.

In the case illustrated in FIG. 9, the maintenance timing $T_{MA}$ of the wind turbine A is made almost the same as the maintenance timing $T_{MB}$ of the wind turbine B so as to have the maintenance cost reduction effect ΔC. The cost reduction effect ΔC may include labor costs of workers moving between the wind farm 1 and a maintenance site, costs to charter transportation machines (a trailer, a helicopter, a crane vehicle, a crane ship and etc) for transporting the workers between the wind farm 1 and the maintenance site, for transporting equipments needed for maintenance, etc. In the case illustrated in FIG. 9, the cost reduction effect ΔC is evenly distributed between the wind turbines A and B.

In the case illustrated in FIG. 9, the combination of the power limit condition and the maintenance timing that maximizes the profit of the entire wind farm 1 is selected although it may not maximize the profit of the wind turbine A, B individually. For instance, for the purpose of maximizing the profit of the wind turbine A alone, the maintenance timing $T_{MA}$ may be set just before the maintenance cost C reaches $C_{full}$ and the maintenance timing for the wind turbine B may be set at the same timing. However, in this case, the maintenance timing for the wind turbine B is moved forward and the maintenance is performed just after the maintenance cost C increases from $C_1$ to $C_2$. Thus, maintenance is performed on the wind turbine B more often than necessary and the profit of the entire wind farm 1 decreases.

While the embodiments of the present invention have been described, it is obvious to those skilled in the art that various changes may be made without departing from the scope of the invention.

For instance, in the above embodiment, the maintenance timings are not varied for each component of each of the wind turbines 100A-100C. But it may be possible to set a plurality of candidate maintenance timings for each component of each of the wind turbines 100A-100C and then to select combination of the power limit condition that maximizes the profit of entire the wind farm 1 and the maintenance timing of each component of each of the wind turbines 100A-100C.

In this case, when estimating the maintenance cost C of each component of the wind turbines 100A-100C, cost reduction effect ΔC of performing maintenance on another component of the same wind turbine at the same maintenance timing may be considered. To do so, the maintenance candidate timing of each component of each of the wind turbines 100A-100C may be set to include the maintenance timing of another part of the same wind turbine.

The invention claimed is:

1. A method for operating a wind farm having a plurality of wind turbines and an operation control system for controlling the plurality of wind turbines, the method comprising the steps of:
   obtaining, for each of the wind turbines, a state value indicative of a damage state or a deterioration state of a component;
   estimating remaining lifetime of the component of each of the wind turbines by using a remaining-lifetime estimation unit of the operation control system, based on the state value;
   estimating, for each of the wind turbines, an income from sales of electric power under a plurality of power limit conditions by using a sales-income estimation unit of the operation control system;
   estimating, for each of the wind turbines, maintenance cost by using a maintenance-cost estimation unit of the operation control system, based on the remaining lifetime of the component for each of a plurality of candidate timings of performing coming maintenance on the component under each of the plurality of power limit conditions obtained by the remaining-lifetime estimation unit;
   selecting, for each of the wind turbines, a set of the power limit condition and the candidate timing that maximizes profit obtained from the wind farm by taking into account a cost reduction effect of performing maintenance together with scheduled maintenance of the wind farm or at the same time as another wind turbine in the wind farm by using a power-limit-condition selection unit and a maintenance-timing selection unit of the operation control system, based on at least the income from sales of electric power and the maintenance cost estimated for each of the wind turbines for each of the candidate timings under each of the power limit conditions which are obtained by the sales-income estimation unit and the maintenance-cost estimation unit, respectively; and
   operating each of the wind turbines by using an operation command unit of the operation control system, based on the selected power limit condition selected by the power-limit-condition selection unit,
   wherein,
   in the step of estimating the maintenance cost, the maintenance cost is estimated under each of the plurality of power limit conditions for each of the plurality of candidate timings including at least one of the following (1) or (2) which is determined based on the remaining lifetime estimated by the remaining-lifetime estimation unit:
   (1) a timing right before or after a lifetime of another wind turbine whose damage or deterioration of a component progresses fastest among the plurality of wind turbines ends;
   (2) a current timing in a case where a lifetime of at least one other wind turbine has ended.

2. The method for operating the wind farm according to claim 1, wherein,
   in the step of estimating the remaining lifetime, the remaining lifetime of the component is estimated based on temporal change of a state value indicating a damage state or a deterioration state of the component.

3. The method for operating the wind farm according to claim 1, further comprising the step of:
   stopping operation of the wind turbine having the component in such a case that the state value of said component is not within a regulation range.

4. A wind farm comprising:
   a plurality of wind turbines;
   a state monitoring unit for obtaining, for each of the wind turbines, a state value indicative of a damage state or a deterioration state of a component;
   a remaining-lifetime estimation unit for estimating remaining lifetime of a component of each of the wind turbines, based on the state value;
   a sales-income estimation unit for estimating, for each of the wind turbines, an income from sales of electric power under a plurality of output control conditions, for each of a plurality of candidate timings of performing coming maintenance on the component;
   a maintenance-cost estimation unit for estimating, for each of the wind turbines, maintenance cost based on the remaining lifetime of the component under each of the plurality of power limit conditions;
   a power-limit-condition selection unit configured to take into account a cost reduction effect of performing maintenance together with scheduled maintenance of the wind farm or at the same time as another wind turbine in the wind farm so as to select, for each of the wind turbines, a power limit condition that maximizes income obtained from the wind farm, based on at least the income from sales of electric power and the maintenance cost estimated for each of the wind turbines for each of sets of the power limit condition and the candidate timing;
   an operation command unit for sending an operation command to each of the wind turbines based on the selected power limit condition; and
   a maintenance-timing selection unit for determining a maintenance timing that maximize the profit obtained from the wind farm, based on at least the income from sales of electric power and the maintenance cost estimated for each of the sets of the candidate timing and the power limit condition,
   wherein
   the maintenance-cost estimation unit is configured to estimate the maintenance cost under each of the plurality of power limit conditions for each of the plurality of candidate timings including at least one of the following (1) or (2) which is determined based on the remaining lifetime estimated by the remaining-lifetime estimation unit:
   (1) a timing right before or after a lifetime of another wind turbine whose damage or deterioration of a component progresses fastest among the plurality of wind turbines ends;
   (2) a current timing in a case where a lifetime of at least one other wind turbine has ended.

5. The wind farm according to claim 4, wherein the remaining-lifetime estimation unit is configured to estimate the remaining lifetime of the component based on temporal change of a state value indicating a damage state or a deterioration state of the component.

6. The wind farm according to claim 5, wherein the operation command unit is configured to stop operation of the wind turbine having the component in such a case that the state value of said component is not within a regulation range.

* * * * *